United States Patent [19]

Andrea et al.

[11] Patent Number: 5,381,473
[45] Date of Patent: Jan. 10, 1995

[54] NOISE CANCELLATION APPARATUS

[75] Inventors: Douglas Andrea, Old Brookville; Martin Topf, Brooklyn, both of N.Y.

[73] Assignee: Andrea Electronics Corporation, Long Island, N.Y.

[21] Appl. No.: 968,180

[22] Filed: Oct. 29, 1992

[51] Int. Cl.⁶ .............................................. H04M 1/00
[52] U.S. Cl. ................... 379/387; 379/395; 379/419; 379/433; 381/71; 381/92
[58] Field of Search ............... 379/387, 390, 395, 437, 379/419, 433; 381/92, 94, 71

[56] References Cited

U.S. PATENT DOCUMENTS

| | | | |
|---|---|---|---|
| 3,830,988 | 8/1974 | Mol et al. | 379/419 |
| 3,889,059 | 6/1975 | Thompson et al. | 379/395 X |
| 4,334,740 | 6/1982 | Wray | 381/94 X |
| 4,463,222 | 7/1984 | Poradowski | 381/94 X |
| 4,672,674 | 1/1987 | Clough et al. | 381/94 X |
| 4,752,961 | 6/1988 | Kahn | 379/419 X |
| 4,783,817 | 11/1988 | Hamada et al. | 381/94 X |

FOREIGN PATENT DOCUMENTS

| | | |
|---|---|---|
| 2305909 | 10/1976 | France . |
| 4008595 | 9/1991 | Germany . |
| 9217019 | 4/1992 | WIPO . |
| 9205538 | 10/1992 | WIPO . |

*Primary Examiner*—James L. Dwyer
*Assistant Examiner*—Paul A. Fournier
*Attorney, Agent, or Firm*—Frishauf, Holtz, Goodman & Woodward

[57] ABSTRACT

Apparatus for reducing acoustic background noise for use with a telephone handset or a boom microphone device or the like. The apparatus includes first and second microphones which are arranged such that the first microphone receives a desired speech input and the background noise present in the vicinity of the speech, and the second microphone receives substantially only the background noise. The background noise from the second microphone is converted into a corresponding electrical signal and subtracted from a signal corresponding to the speech and background noise obtained from the first microphone so as to produce a signal representing substantially the speech.

28 Claims, 6 Drawing Sheets

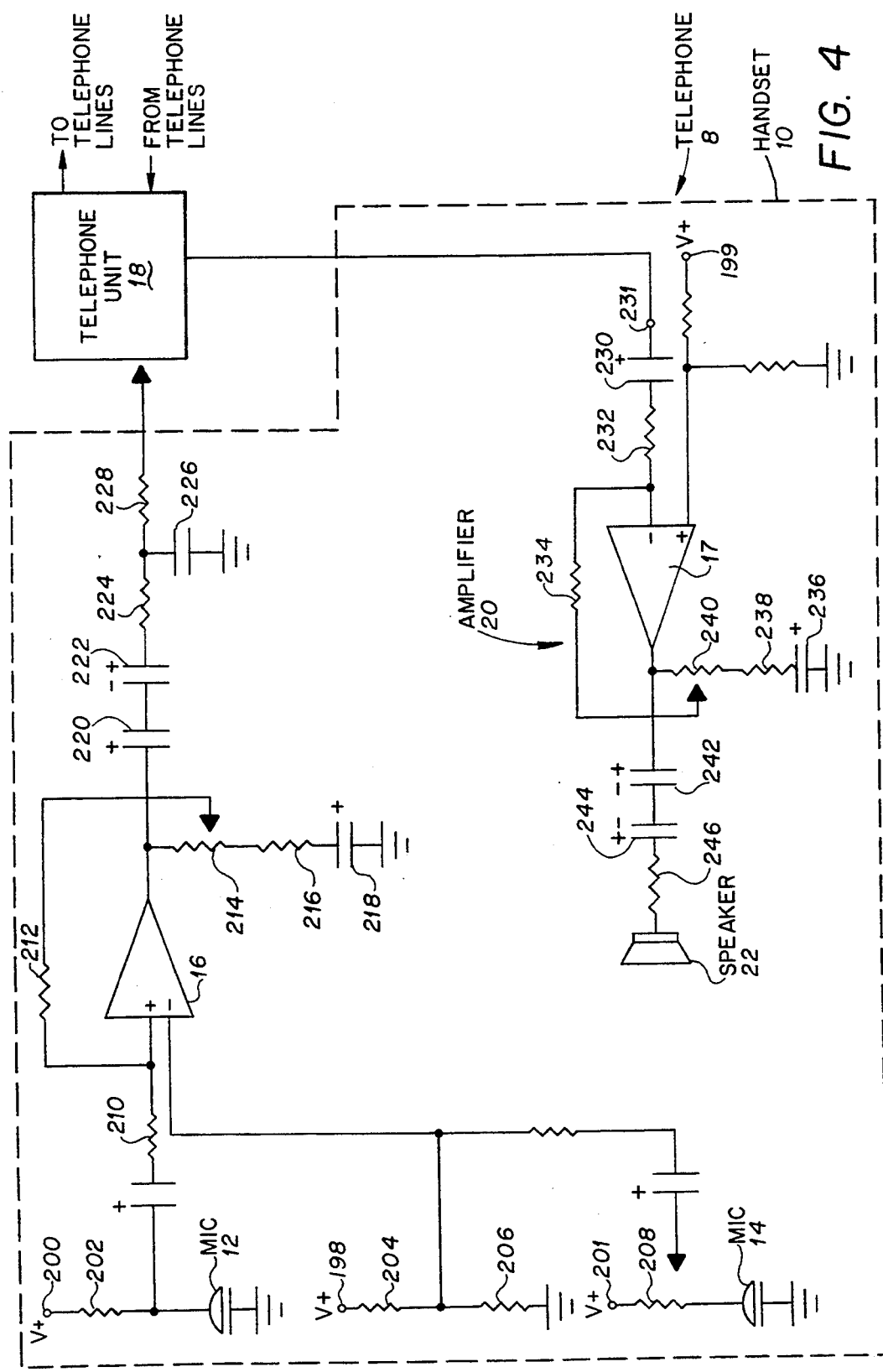

NOISE CANCELLATION APPARATUS

BACKGROUND OF THE INVENTION

1. Field of the Invention

This invention relates to a noise cancellation apparatus and, more particularly, to an apparatus for canceling or reducing background acoustic noise for use with a telephone handset or a boom microphone device or the like.

2. Description of the Prior Art

As is to be appreciated, in numerous situations, the presence of background acoustic noise is undesirable. As an example, consider the situation in which an operator is attempting to conduct a telephone conversation from a telephone or such similar device located in a noisy area. In this situation, loud acoustic background noise is received by a microphone in the handset of the telephone and converted to an electrical signal which is supplied to the telephone(s) of the person(s) having the conversation with the operator and is converted thereat to an acoustic signal. As a result, the person to whom the operator is communicating constantly hears the loud background noise. Further, when the person is speaking, such speech is combined with the background noise and, as such, may be difficult for the other person(s) to understand. As a result, the operator may have to shout into the microphone of the telephone. Furthermore, the signal representing the background noise is also supplied from the microphone in the operator's handset to the speaker in the operator's handset. Thus, the operator also constantly hears the background noise from the speaker in the operator's handset and, when the other person is speaking, may impair the understanding thereof.

As another example, consider the situation in which a pilot who is operating a helicopter or the like wishes to communicate with another person by way of radio frequency (RF) communication. In this situation, the pilot typically speaks into a so-called boom microphone which is coupled to a radio transmitting/receiving device whereupon the speech is converted into RF signals which are transmitted to a second receiving/transmitting device and converted therein to speech so as to be heard by the other person(s). As with the above situation of a telephone located in a noisy area, the loud background noise from the helicopter is received and converted into an electrical signal by the boom microphone device and thereafter supplied to the receiving device. As a result, the person(s) communicating with the pilot hears the loud background noise. This may be particularly annoying when the pilot leaves the radio transmitting/receiving device in the "ON" position while operating the helicopter.

In an attempt to reduce background noise so as to improve performance of a telephone or a boom microphone located in a noisy environment or the like, pressure gradient microphones may be utilized. Basically, a pressure gradient microphone responds to the difference in pressure at two closely spaced points. When used in an environment where the pressure gradient of the background noise is isotropic, the electrical signal produced by the pressure-gradient microphone due to such background noise is effectively zero. However, in most actual situations, the pressure gradient of the background noise is not isotropic and, as a result, in these situations, the performance of the pressure-gradient microphone is adversely affected. Additionally, since voice or speech propagates in more than one direction, the electrical signal produced by the microphone which corresponds thereto is often degraded. Thus, even if a pressure gradient microphone is utilized in either a telephone handset or a boom microphone, the desired amount of background noise cancellation may not be sufficient and the performance may not be adequate.

Furthermore, since two opposite sides of a pressure-gradient microphone respond to acoustic pressure, as previously mentioned, the handset of an existing telephone would have to be substantially modified so as to enable these two sides of the microphone to respond to the acoustic pressure. Moreover, as a result of using such a microphone in a telephone handset, the electrical signals produced therefrom should be amplified. Thus, to replace the conventional microphone in a telephone handset of an existing telephone with a pressure-gradient microphone would typically necessitate replacing the handset with a new handset and, as such, would be relatively expensive.

As an alternative to using pressure-gradient microphones, an acoustic feed-back type system may be utilized. Such a system normally includes compensation filters which are used to equalize the transfer function of the speakers. Since the characteristics of the speakers are tightly controlled by these filters, the cost of tile filters is relatively high. As a result, such acoustic feedback systems are typically relatively expensive.

Thus, the prior art has failed to provide a relatively low-cost means for reducing background noise to an acceptable level for use with telephones and/or boom microphone devices or the like, and a cost-effective means for enabling existing telephones to reduce background noise to an acceptable level.

OBJECTS AND SUMMARY OF THE INVENTION

An object of the present invention is to provide noise reduction apparatus which overcomes the problems associated with the prior art.

More specifically, it is an object of the present invention to provide noise reduction apparatus which reduces background noise to an acceptable level.

Another object of the present invention is to provide noise reduction apparatus as aforementioned for use with a telephone or boom microphone device or the like.

It is still another object of the present invention to provide noise reduction apparatus as aforementioned which is relatively inexpensive.

It is yet another object of the present invention to provide a relatively low-cost noise reduction apparatus for use with telephones which is operable with standard available on-line power.

A still further object of the present invention is to provide a relatively low-cost noise reduction apparatus which is readily adaptable to handsets of existing telephones and which is operable with standard available on-line power.

A yet further object of the present invention is to provide a relatively low-cost noise reduction apparatus for use with telephones or which may be readily adaptable to handsets of existing telephones which enables an operator to selectively amplify a received signal.

In accordance with an aspect of this invention, a telephone handset apparatus for use with a telephone operable by standard power supplied to the telephone handset for transmitting and receiving signals representing speech between two or more operators is provided. The apparatus includes a housing having a first microphone means for receiving a first acoustic signal composed of speech from the operator using the apparatus and background noise in the vicinity of the speech and for converting the first acoustic sound to a first signal, and a second microphone means arranged at a predetermined angle with respect to the first microphone means for receiving a second acoustic sound composed of substantially the background noise and for converting the second acoustic sound to a second signal; and a device for subtracting the second signal from the first signal so as to obtain a signal representing substantially the speech, Other objects, features and advantages according to the present invention will become apparent from the following detailed description of the illustrated embodiments when read in conjunction with the accompanying drawings in which corresponding components are identified by the same reference numerals,

BRIEF DESCRIPTION OF THE DRAWINGS

FIG. 4 is a schematic diagram of the block diagram of FIG. 2;

DETAILED DESCRIPTION OF THE PREFERRED EMBODIMENTS

Figure 1:
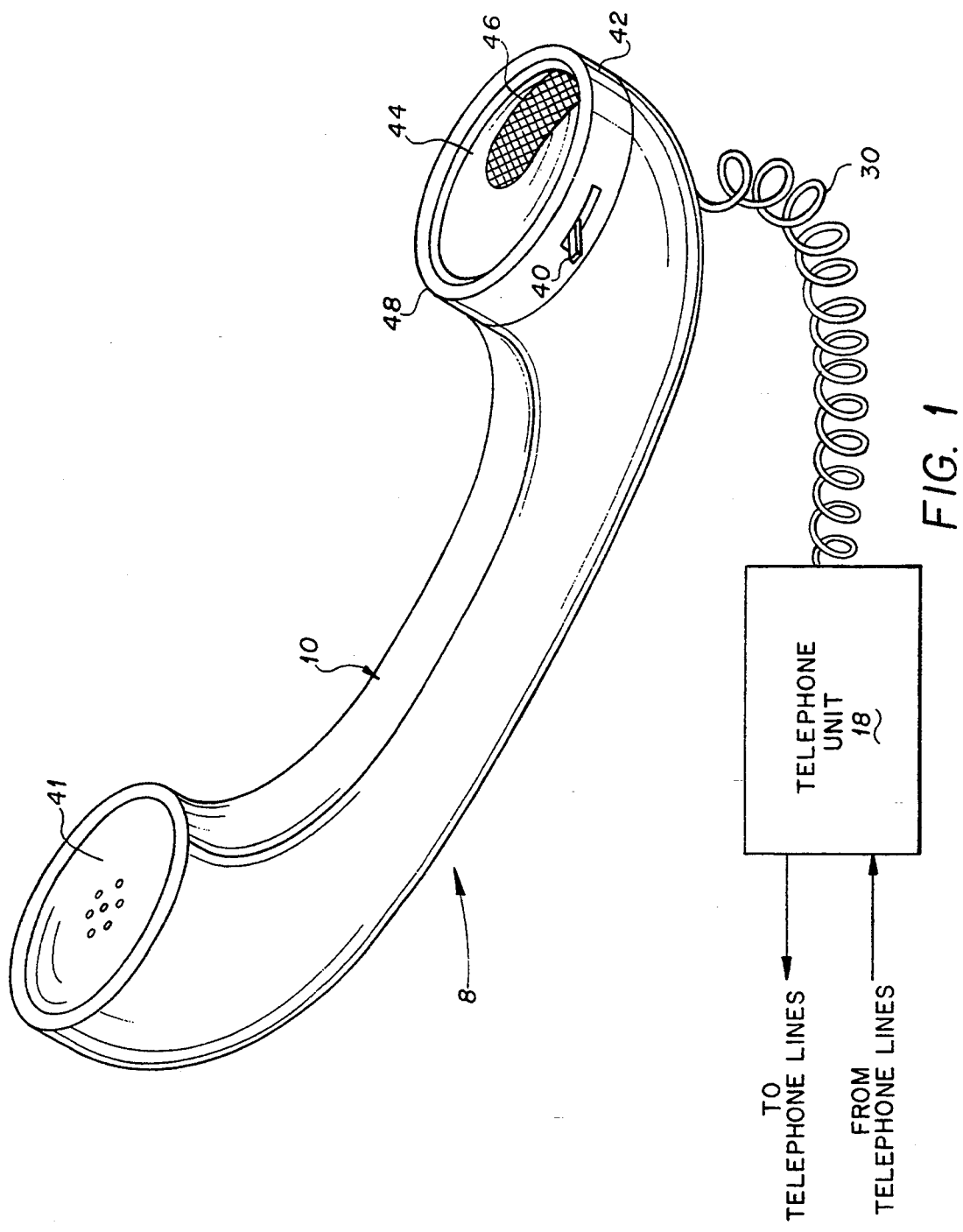
FIG. 1 illustrates a telephone having a noise reduction apparatus according to an embodiment of the present invention.

FIG. 1 illustrates a telephone 8 which utilizes a noise reduction apparatus in accordance with an embodiment of the present invention. As shown therein, the telephone 8 generally includes a handset 10, having a speaker portion 41 and a receiver portion 42, and a telephone unit 18 which may be coupled therebetween by way of a telephone cord 30. Alternatively, the telephone may be a cordless type telephone and, as such, the handset 10 is coupled to the telephone unit 18 by way of RF waves. The receiver portion 42 includes first and second microphones 12 and 14, respectively, (FIG. 2), a switch 40 for adjusting the volume of a signal supplied to the speaker portion 41, and a cap 48 having a recessed portion 44 and a mesh portion 46.

Figure 2:
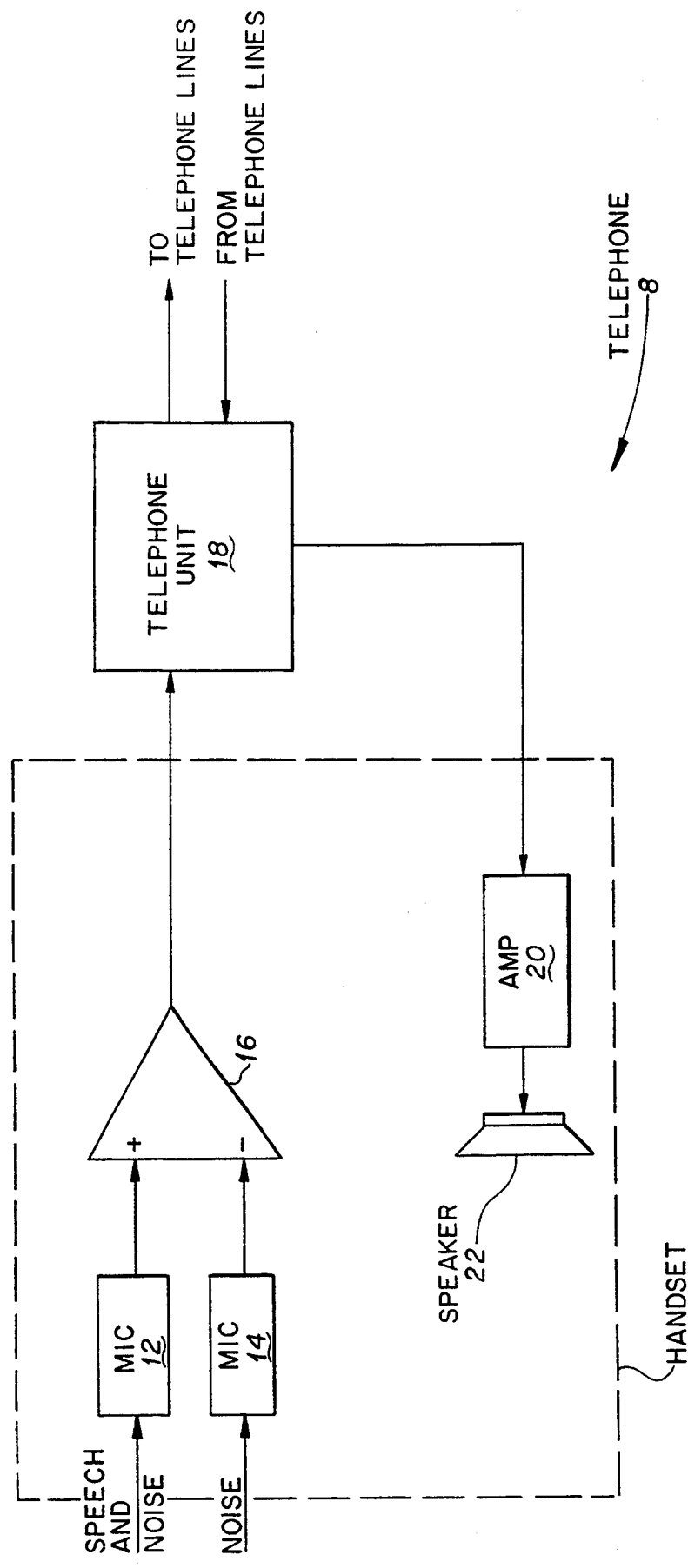
FIG. 2 is a block diagram of the noise reduction apparatus used in the telephone of FIG. 1.

FIG. 2 illustrates the telephone 8 in block diagram form. As shown therein, the handset 10 generally includes first and second microphones 12 and 14, respectively, a subtracting device 16, which in a preferred embodiment is an operational amplifier ("op-amp"), an amplifier 20, which is preferably an op-amp, and a speaker 22. The first and second microphones 12 and 14, respectively, op-amp 16 and amplifier 20 are preferably contained within the receiver portion 42 (see FIG. 1).

Acoustic signals composed of speech or the like and background noise are supplied to the first microphone 12 and converted therein into a corresponding electrical signal which is thereafter supplied to the plus terminal of the op-amp 16. The background noise is supplied to the second microphone 14 and converted therein into a corresponding electrical signal which is thereafter supplied to the minus terminal of the op-amp 16. The op-amp 16 is adapted to subtract the noise signal from the second microphone 14 from the speech and noise signal from the first microphone 12 and to supply therefrom an electrical signal representing substantially the speech to the telephone unit 18 whereupon the speech signal is transmitted therefrom through the telephone lines to a desired telephone or telephones. The output signal from the op-amp 16 is also combined in the telephone unit 18 with a received signal from the telephone lines and supplied to the amplifier 20. The op-amps 16 and 17 (see FIG. 4) are preferably relatively low-power integrated circuits (IC's), such as complementary metal oxide semiconductors (CMOS), and may be constructed from either one or more CMOS IC chips. Although not shown in FIG. 2, amplifier 20 may be selectively set by use of the switch 40 (FIG. 1) by the operator so as to adjust the amplification of the received signal to a desired level. The amplified signal from the amplifier 20 is supplied to the speaker 22, whereupon the amplified signal is converted into an acoustic signal so as to be heard by the operator.

Figure 3A:
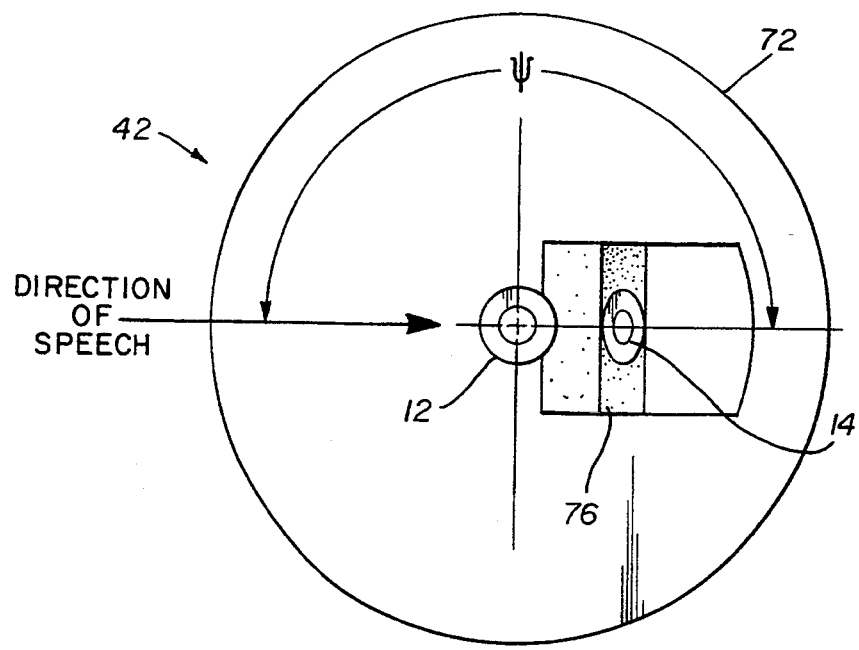
FIG. 3A is a front plan view of the receiver portion of the telephone of FIG. 1.
Figure 3B:
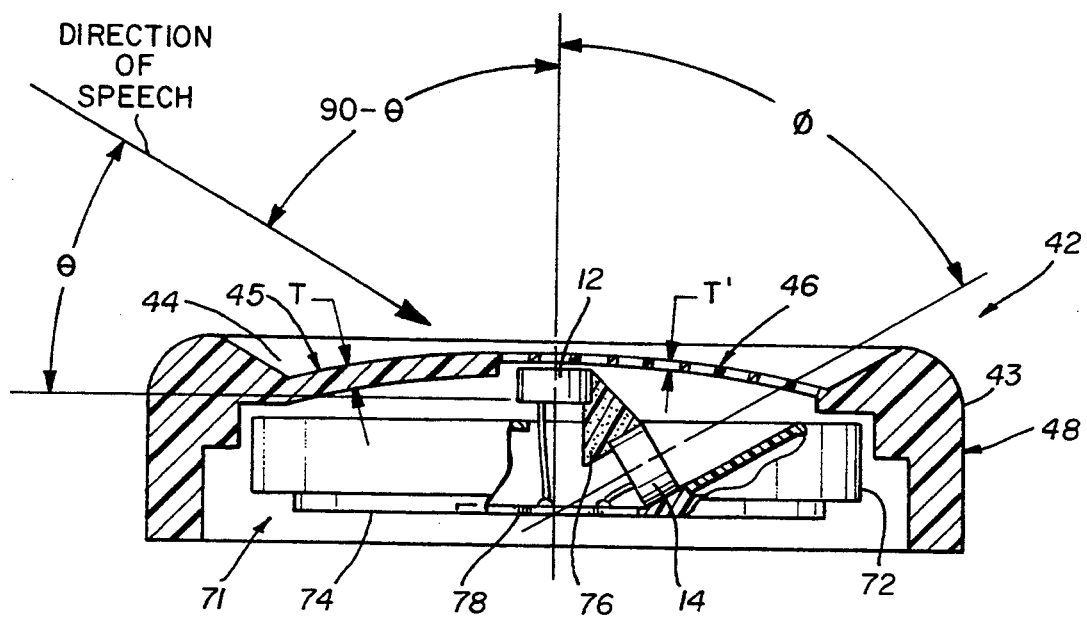
FIG. 3B is a cross-sectional side view of the receiver portion of the telephone of FIG. 1 with the cap removed.

FIGS. 3A and 3B illustrate two views of the receiving portion 42, in which the cap 48 is removed in the view of FIG. 3A. As shown therein, the receiving portion 42 generally includes a housing 74, a circuit board assembly 78, the first and second microphones 12 and 14, respectively, and the cap 48. The first and second microphones 12 and 14, respectively, which are preferably electret microphones or similar such microphones, are arranged or positioned as hereinafter described. These microphones are held in place or secured by a holding member 76 which, for example, may be constructed of a foam-like material, which, in turn, is secured to the housing 74. The respective outputs from the first and second microphones 12 and 14 are supplied through respective wires (not shown) to the op-amp 16 which is contained on the circuit board assembly 78 which, in turn, is attached to the housing 74. As hereinafter more fully described, the circuit board 78 may contain additional circuit elements for processing the signals received from the first and second microphones and for amplifying signals for supply to the speaker 22 (FIG. 2). A cover 72 may be utilized which is attached to the housing 74 by use of adhesives or the like or alternatively may be sonically welded together. The cover 72 and the housing 74 with the circuit board assembly 78, holding member 76 and the first and second microphones 12 and 14 form an assembly 71.

The cap 48, which may be constructed from a plastic-type material such as polycarbonate, includes an annular side member 43 and a portion 45 having a typical thickness T which is coupled to the side member 43 and arranged so as to be lower than the upper portion of the side member by a minimum predetermined amount such as 0.020 of an inch, thereby creating a recessed portion 44. The portion 45 includes a portion 46 having a thickness T' which is less than the thickness T and which has a plurality of through holes contained therein and may resemble a mesh-like portion. In a preferred embodiment, the thickness T' of the portion 46 has a thickness of less than 0.030 of an inch. Since the portion 46 represents a relatively small amount of the portion 45, reducing the thickness therein does not adversely affect the overall structural rigidity of the cap 48. Alternatively, the portion 46 may be constructed from a stronger material, for example, stainless steel or such similar material, and combined with the portion 45. As is to be appreciated, by arranging the portions 45 and 46 so as to be recessed from the upper portion of the side member 43, even when the receiver portion 42 is placed on a surface, the side member 43, and not the portions 45 or 46, contact such surface. As a result, any loads are not directly impacted on the portion 45 and/or the portion 46, but are instead delivered to the side member 43.

The cap 48 is positioned over the assembly 71 so that the first and second microphones 12 and 14, respectively, are arranged below the portion 46 with the first microphone positioned relatively close to the underside of the portion 46. Thus, the speech travels a relatively short distance from an operator, who is speaking into the receiver portion 42 from a distance of preferably less than 1 inch, through the portion 46 to the first microphone. As a result, acoustic distortions are minimized.

The arrangement of the first and second microphones 12 and 14, respectively, within the receiver portion 42 is illustrated in FIGS. 3A and 3B. More specifically, as shown in FIG. 3B, the first and second microphones are arranged so as to have an angle $\phi$ therebetween, which preferably has a value in a range between 30° and 60°. The first and second microphones are further respectively arranged so as to have an angle $\Theta$ and $[(90-\Theta)+\phi]$ between a plane parallel to the receiving or "sensitive" surface of the first microphone 12 and the direction of speech from an operator, and an axis normal to the sensitive surface of the second microphone 14 and the direction of speech, as shown in FIG. 3B; and so as to have an angle $\Psi$ between the direction of speech and the second microphone, as shown in FIG. 3A. In a preferred embodiment, the angle $\Theta$ has a value of less than approximately 35° and the angle $\Psi$ has a value of approximately 180°. As a result of arranging the first and second microphones in this manner, the first microphone 12 receives both the speech from the operator and the background acoustic noise which is present in the vicinity, and the second microphone 14 essentially receives only the same background acoustic noise which is received by the first microphone.

Although, as previously mentioned, the angle $\phi$ has a value which is preferably between 30° and 60°, the first and second microphones 12 and 14, respectively, may nevertheless operate satisfactorily even if arranged so as to have an angle $\phi$ which lies outside this range. However, as the angle $\phi$ becomes substantially smaller than 30° or larger than 60°, the performance may be adversely affected. That is, when the angle $\phi$ becomes substantially smaller than 30°, the second microphone 14 receives both the speech and background noise. As a result, upon subtracting the output signal of the second microphone 14 from the output signal of the first microphone 12, a portion or all of the speech may be canceled. On the other hand, when the angle $\phi$ is substantially larger than 60°, the background noise received by the second microphone 14 may not be similar to that received by the first microphone 12. As a result, subtracting the output signal of the second microphone 14 from the output signal of the first microphone 12 may not adequately cancel the background noise received by the first microphone.

In a like manner, although the angles $\Theta$ and $\Psi$ have preferred values of less than 35° and approximately 180°, respectively, as previously mentioned, the first and second microphones may operate satisfactorily even if arranged so as to have different values of these angles. However, as the values of the angles $\Theta$ and $\Psi$ become substantially different from the respective preferred values, the performance may be adversely affected. That is, when the angle $\Theta$ becomes substantially larger than 35°, the second microphone 14 may receive both the speech and background noise. Similarly, when the angle $\Psi$ is substantially smaller or larger than 180°, the second microphone 14 may receive both the speech and background noise. As a result, in either of these situations, upon subtracting the output signal of the second microphone 14 from the output signal of the first microphone 12, a portion or even all of the speech may be canceled.

As is to be appreciated, by using the above-described devices and materials for the components of the receiver portion 42, the cost for constructing such receiver portion is relatively low. Further, by using CMOS chips, as previously described, the power consumption of the receiver portion is kept relatively low. As a result, the receiver pollution may be powered by the standard power available in the handset and, as such, does not require additional power or transformers or the like. Furthermore, although the receiver portion 42 has been described for assembly with the handset 10 of the telephone 8, which is a new telephone, such receiver portion, or a slight variation thereof, may be used in handsets of existing telephones. That is, in this latter situation, the cap and microphone contained within the handset of an existing telephone are merely replaced with the receiver portion 42. Thus, such use of the receiver portion 42 provides a relatively easy and low-cost means to modify a handset of an existing telephone to include the present noise reduction apparatus.

FIG. 4 illustrates a schematic diagram of one circuit arrangement of the telephone 8 shown in FIGS. 1 and 2. As shown in FIG. 4, the first microphone 12 is coupled through a resistor 202, which is adapted to function as a current limiting resistor so as to correct the bias of an output from the first microphone, to an input terminal 200. The first microphone 12 is further coupled through a resistor 210 to the plus terminal of the op-amp 16 and through a resistor 212 to a variable resistor 214. The second microphone 14 is coupled through a variable resistor 208, which is adapted to function as a current limiting resistor so as to correct the bias of an output of the second microphone, to an input terminal 201, and to the minus terminal of the op-amp 16. The limiting resistor 208 is preferably a variable current limiting resistor which enables the level of the output signal from the second microphone to be matched to within a predetermined value to the level of the output signal of the first microphone 12. More specifically, the limiting resistor 208 enables the output signal of the second microphone 14 to be weighted such that when a signal having a similar level is outputted from the first microphone 12, the amplitude of the difference therebetween is minimized. The value of the current limiting resistor 208 can be selected according to minimization criteria. An input terminal 198 is connected to resistors 204 and 206, which are adapted to divide the voltage received at the input terminal 198, and to the minus terminal of the op-amp 16. The output of the op-amp 16 is coupled to capacitors 220, 222 and 226 and resistors 224 and 228 which, in turn, is connected to a "microphone input" terminal of the telephone unit 18. The output from the op-amp 16 is further coupled through a variable resistor 14, a resistor 216 and a capacitor 218 to ground. Resistors 210, 212 and 216 and variable resistor 214 provide variable gain, for example, 20 to 1 amplification, to the output of the op-amp 16. The capacitors 218, 220 and 222 are adapted to remove residual dc (direct current) levels which may be present in the output signal from the op-amp 16. The resistors 224 and 228 and the capacitor 226 are adapted to function as a low-pass filter having a break point at a predetermined value which, for example, may be 3.7 kHz.

The telephone unit 18 is further connected to the telephone lines and is adapted to receive signals through the microphone input terminal and to supply these signals to the desired telephone or telephones by way of the telephone lines. The telephone unit 18 is further adapted to receive signals from another telephone or telephones by way of the telephone lines and to combine such signals with those received through the microphone input terminal, as previously described, and to supply the combined signal to a speaker input terminal 231. The input terminal 231 is connected through a capacitor 230, which is adapted to block dc signals, and a resistor 232 to the minus terminal of an op-amp 17 and through a resistor 234 to a variable resistor 240. An input terminal 199 is connected to the plus terminal of the op-amp 17. The output from the op-amp 17 is connected through capacitors 242 and 244 and a resistor 246 to the speaker 22. The output from the op-amp is further connected through the variable resistor 240, a resistor 238 and a capacitor 236 to ground.

The operation of tile telephone 8 shown in FIG. 4 will now be described below.

Upon activating the handset 10, by lifting the handset 10 from the switch hook (not shown) or the like, standard telephone line voltage is applied to input terminals 198, 199, 200 and 201. A signal from the first microphone 12, which has been bias corrected by the current limiting resistor 202, is supplied through the resistor 210 to the plus terminal of the op-amp 16. An output signal from the second microphone 14, which has been bias corrected by the current limiting resistor 208, is supplied to the minus terminal of the op-amp 16. The op-amp 16 subtracts the signal received from the second microphone 14 from that received from the first microphone 12 and outputs the resulting subtracted signal. DC levels which may be present in the output signal are removed and the signal is amplified. High frequency signals, such as those over 3.7 kHz, are then removed from the amplified output signal and the resulting signal is supplied to the telephone unit 18. Thus, a voltage signal is supplied to the telephone unit 18 which is proportional to the difference between the voltages generated by the first and second microphones 12 and 14, respectively.

An output signal from the telephone unit 18, which is a combination of the signals received through the microphone input terminal and the telephone lines, is supplied to the input terminal 231 of the amplifier 20. The signal from the input terminal 231 is supplied to the capacitor 230 so as to remove any dc signals which may be present. The output from the capacitor 230 is supplied through the resistor 232 to the minus terminal of the op-amp 17. The op-amp 17 subtracts the signal from the telephone unit 18 from the signal received from the input terminal 199 and supplies a subtracted signal therefrom. Such signal may be selectively amplified, through the use of resistors 232, 234 and 238 and variable resistor 240, by the operator by use of the switch 40 (FIG. 1). Any dc signals which may be present in the amplified signal are thereafter removed by the capacitors 242, 244 and 236. The output signal from the capacitor 244 is current limited by the resistor 246 and is thereafter supplied to the speaker 22 so as to be converted thereat into an acoustic signal.

Figure 5:
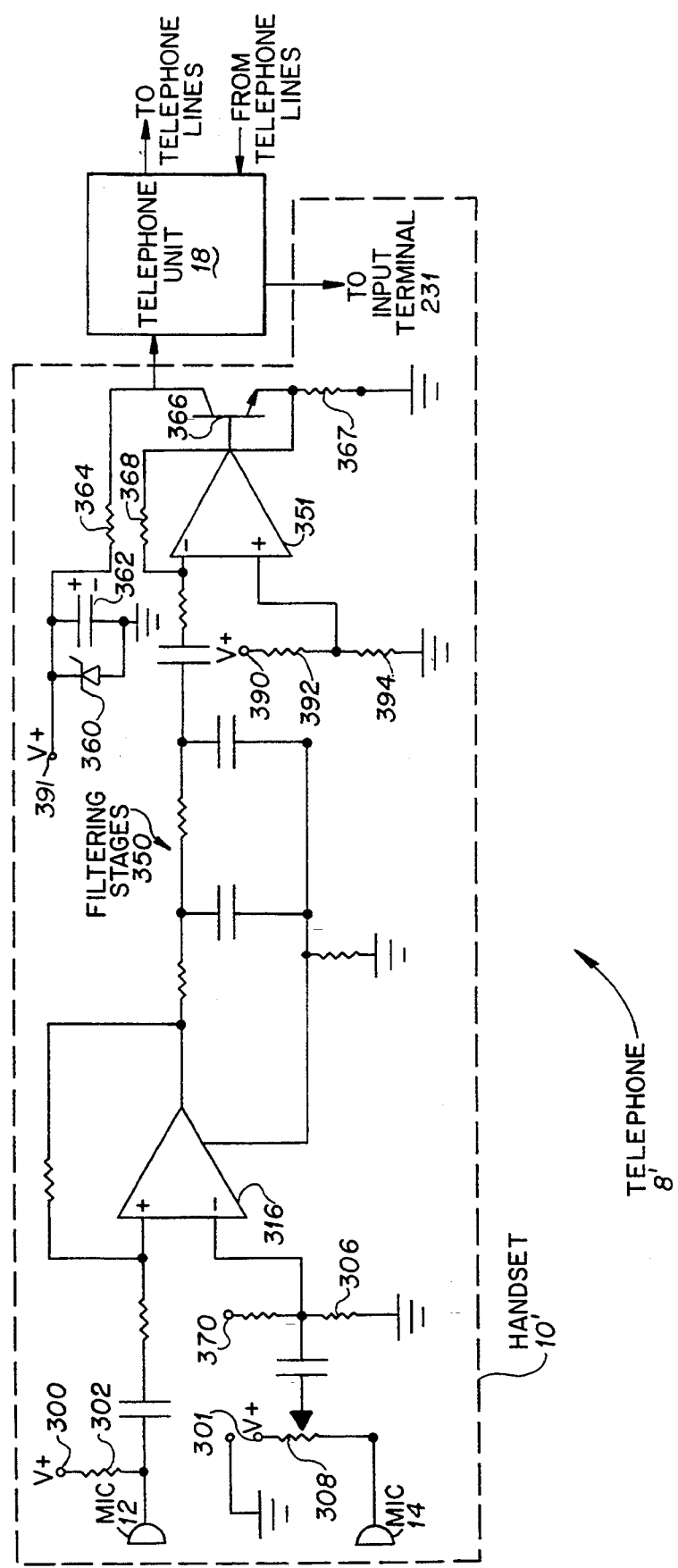
FIG. 5 is another schematic diagram of the noise reduction apparatus illustrated in FIG. 2.

FIG. 5 illustrates an alternative arrangement for processing the signals obtained from the first and second microphones 12 and 14, respectively, so as to provide a current output for supply to the telephone unit 18 which is proportional to the difference of the voltages generated by the first and second microphones.

More specifically, the circuit arrangement of FIG. 5 includes a handset 10' having a plurality of input terminals 300, 301, 370 and 390 which are each adapted to receive standard available on-line power. The first microphone 12 is coupled through a current limiting resistor 302 to the input terminal 300 and is further coupled to the plus terminal of a subtracting device 316, which is preferably a CMOS op-amp. The output from the second microphone 14 is coupled through a variable current limiting resister 308 to the input terminal 301 and is further coupled to the minus terminal of the op-amp 316. The signal outputted from the op-amp 316 is supplied through filtering stages 350 to the minus terminal of a subtracting device 351 which is preferably a CMOS op-amp. The filtering stages 350 are adapted to provide a predetermined frequency response characteristic such as a signal roll-off at a predetermined frequency. As is to be appreciated, although two filtering stages are shown in FIG. 5 any number of filtering stages may be utilized. The input terminal 390 is coupled to resistors 392 and 94, which are adapted to reduce the signal supplied thereto, and to the plus terminal of the op-amp 351. An output signal from the op-amp 351 is supplied to the base of a transistor 366. The input terminal 391 is connected to a Zener diode 360, a capacitor 362 and a resistor 364 which, in turn, is connected to the collector of the transistor 366 and to the microphone input terminal of the telephone unit 18. The emitter of the transistor 366 is coupled through resistors 367 and 368 to the minus terminal of the op-amp 351 so as to provide a feedback loop thereto. The op-amp 351 and the associated components provide electrical isolation between the filtering stages 350 and the transistor 366. The transistor 366 is adapted to amplify the signal supplied to the telephone unit 18.

The output from the telephone unit 18 is coupled to the input terminal 231 (FIG. 4) and is thereafter processed in the manner previously described with reference to the handset 10 of FIG. 4 so as to provide an acoustic signal from the speaker 22.

The operation of the telephone 8' will now be described below.

Upon applying power to the handset 10', by lifting the handset from the switch hook (not shown) or the like, standard telephone line voltage is applied to input terminals 300, 301, 370, 390 and 391. A signal from the first microphone 12, which has been bias corrected by the current limiting resistor 302, is supplied to the plus terminal of the op-amp 316. An output signal from the second microphone 14, which has been bias corrected by the current limiting resistor 308, is supplied to the minus terminal of the op-amp 316. The resistor 308 is preferably a variably current limiting resistor which enables the level of the output signal from the second microphone 14 to be matched to within a predetermined value to the level of the output signal of the first microphone 12, in a manner substantially similar to that previously described for resistor 208. The output difference signal from the op-amp 316 is provided though the filtering stages 350, which may include one or more RC networks or equivalent circuits, so as to limit the upper frequency of the output signal to a predetermined value which, for example, may be 3.7 kHz. The output signal from the filtering stages 350 is supplied to the minus terminal of the op-amp 351 and a voltage signal from the input terminal 390, which has been divided to a predetermined value such as one half thereof, is supplied to the plus terminal of the op-amp 351 which, in turn, calculates the difference therebetween and supplies a corresponding output signal to the base of the transistor 366. The voltage from the input terminal 391 is supplied through the resistor 364 to the collector of the transistor 366. As a result, an amplified signal is supplied from the handset 10' to the telephone unit 18 for supply therefrom through the telephone lines to the desired telephone(s) and for combining with a received signal from the telephone(s) for supply to the input terminal 231 in a manner similar to that previously described with reference to FIG. 4.

The individual circuit components without reference designations depicted in FIGS. 4 and 5 are connected as shown and will not be discussed further, since the connections and values are apparent to those skilled in the art and are not necessary for an understanding of the present invention.

Figure 6A:
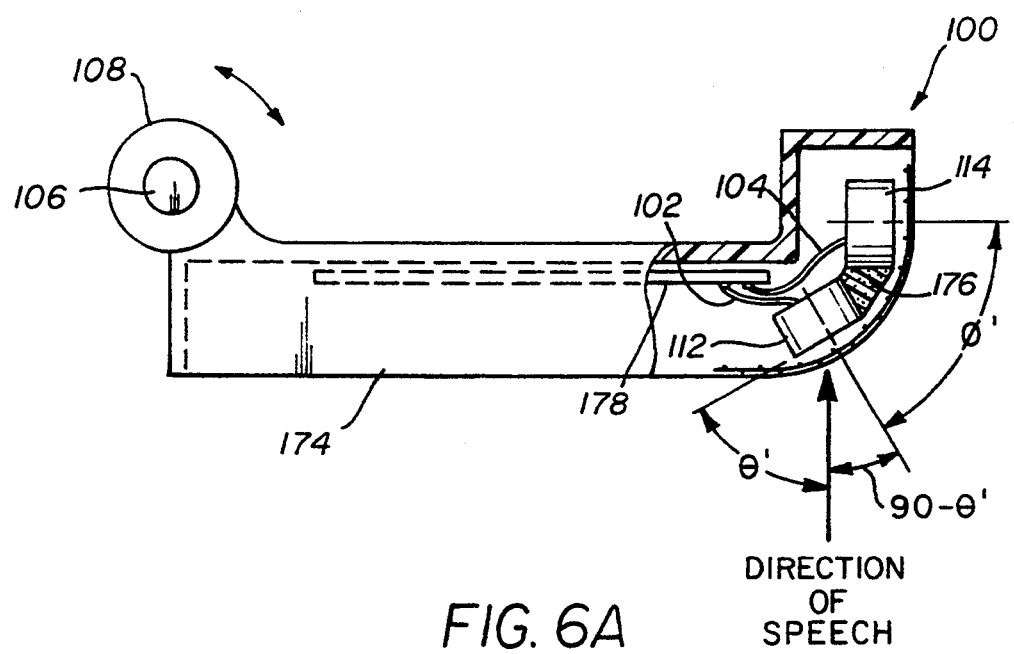
FIGS. 6A, 6B and 6C illustrate a boom microphone device utilizing a noise reduction apparatus according to an embodiment of the present invention.
Figure 6B:
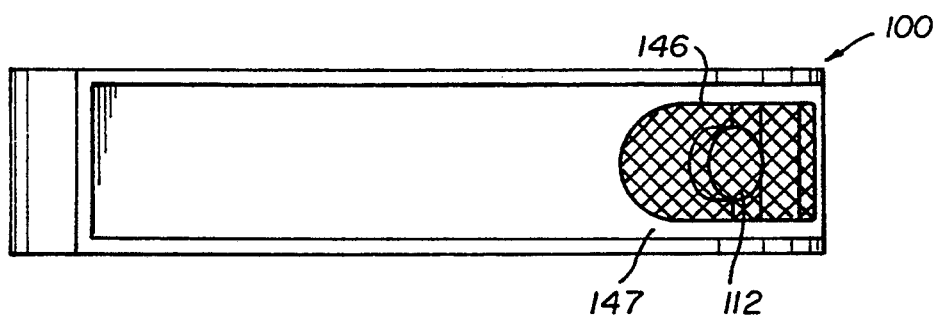
Figure 6C:
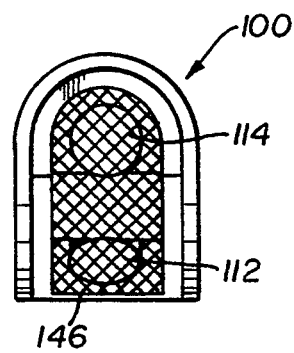

FIGS. 6A, 6B and 6C illustrate a boom microphone 100 which utilizes a noise cancellation apparatus in accordance with an embodiment of the present invention. More specifically, the boom microphone 100 generally includes a housing 174, a circuit board assembly 178, first and second microphones 112 and 114, respectively, and a portion 147. The housing 174, which may be constructed from either a plastic-like or metal-type material, includes a circular portion 108 having a hole therethrough so as to enable a shaft 106 to be inserted therein. As a result, the boom microphone 100 may rotate about the shaft 106 as illustrated in FIG. 6A.

The first and second microphones 112 and 114 are respectively coupled to the circuit board assembly 178 by wires 102 and 104. The circuit board assembly 178 contains circuitry similar to that on the circuit board assembly 78 which, as previously described, processes the signals from the first and second microphones 12 and 14, respectively, for supply to the telephone unit 18 and, as such, in the interest of brevity, will not be further described herein. Therefore, the circuit board assembly 178 is adapted to receive a speech and background noise signal from the first microphone 112 and to subtract therefrom the background noise signal from the second microphone 114 so as to derive a signal which represents substantially the speech. Such signal is supplied to a transmitting device (not shown) so as to be converted to a RF signal and transmitted to a remote receiving device (not shown). The first and second microphones 112 and 114, respectively, are held in place by a holding member 176 which, for example, may be constructed of a foam-like material. A mesh-like screen 146 which, for example, may be fabricated from a plastic-type or a metal material or the like, is attached to the cut away portion 147 so as to protect the first and second microphones. The mesh 146 has a predetermined thickness which, for example, may be approximately 0.030 or less of an inch.

The first and second microphones 112 and 114, respectively, which may be electret microphones, are arranged in a manner similar to that of the previously described first and second microphones 12 and 14, respectively, of the handset 10. That is, the first and second microphones 112 and 114, are respectively positioned so as to have an angle $\Theta'$ and $[(90-\Theta')+\phi']$ between a plane parallel to the receiving or sensitive surface of the first microphone and the direction of speech from an operator, and between an axis normal to the sensitive surface of the second microphone and the direction of speech, as shown in FIG. 5A. Further, the first and second microphones 112 and 114, respectively, are arranged so as to have an angle $\phi'$ therebetween, which has a preferred value in a range between 30° and 60°. The first and second microphones 112 and 114, respectively, are located in relatively close proximity to the mesh 146 and the cut away portion 147 of the housing 174 so as not to receive acoustic sounds which have been unacceptably distorted.

Although the above embodiments have been described as having only one first microphone 12 (112) and one second microphone 14 (114), the invention is not so limited and any number of microphones may be utilized for the first microphone and/or the second microphone. For example, a receiver portion 42' (not shown) may be configured which includes two or more microphones operating as a first microphone 12' (not shown) and two or more microphones operating as a second microphone 14' (not shown). In this configuration, when using multiple microphones for the first and/or second microphones, respective variable current limiting resistors are preferably provided for all but one microphone for the first microphone 12' and for all microphones for the second microphone 14'. Thus, the outputs from the first and second microphones, 12' and 14', respectively, would comprise a weighted sum of several such microphone output voltages. The current limiting resistors are preferably set to respective values so as to minimize some functional of the difference of the first and second microphones 12' and 14', respectively. The criterion for selecting the values of the current limiting resistor or equivalently the weighting function of each microphone could be selected according to any well known gradient search algorithm, so as to minimize the functional.

Further, although the above-described embodiments of the present invention have been described for use with telephone handsets and boom microphones and the like, the present invention is not so limited and may be used with numerous other devices such as intercom systems and so forth. Additionally, the present invention may be used with processing devices operating in accordance with predetermined processing algorithms, as described in U.S. patent application Ser. No. 07/887,500 filed May 22, 1992, which has a common assignee with the present application, and which is hereby incorporated by reference.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A telephone handset apparatus having a speaker portion and a receiver portion for use with a telephone unit operable by standard power supplied from said telephone unit for transmitting and receiving signals representing speech between two or more operators, said apparatus comprising:

a housing in the receiver portion having first microphone means for receiving a first acoustic sound composed of speech from the operator using said apparatus and background noise in the vicinity of said speech and for converting said first acoustic sound to a first signal, and second microphone means arranged at a predetermined angle $\phi$ with respect to said first microphone means, and adjacent thereto, for receiving a second acoustic sound composed of substantially said background noise and for converting said second acoustic sound to a second signal; and means for subtracting said second signal from said first signal so as to obtain a signal representing substantially said speech.

2. The telephone handset apparatus according to claim 1, wherein said predetermined angle $\phi$ lies within a range from approximately 30 degrees to approximately 60 degrees.

3. The telephone handset apparatus according to claim 2, wherein said first microphone means is arranged in said housing such that an angle $\Theta$ formed between a plane passing through a portion of said first microphone means which receives said first acoustic sound and an input direction of said speech is less than approximately 35 degrees.

4. The telephone handset apparatus according to claim 3, wherein said second microphone means is arranged in said housing such that an angle $\beta$ formed between an axis normal to the receiving portion of said second microphone means and said input direction of said speech is approximately equal to $[(90-\Theta)+\phi]$ degrees.

5. The telephone handset apparatus recording to claim 1, wherein at least one of said first and second microphone means includes a plurality of microphones.

6. The telephone handset apparatus according to claim 1, further comprising amplifier means for selectively amplifying a signal received from one or more of said operators so as to produce an amplified signal therefrom.

7. The telephone handset apparatus according to claim 6, wherein said first and second microphone means, said means for subtracting and said amplifier means are powered by said standard power supplied from said telephone unit.

8. The telephone handset apparatus according to claim 7, wherein said means for subtracting and said amplifier means are formed on a low-powered integrated circuit chip.

9. The telephone handset apparatus according to claim 8, wherein said low-powered integrated circuit chip is a Complementary Metal Oxide Semi-conductor (CMOS) chip.

10. The telephone handset apparatus according to claim 3, further comprising protecting means for protecting said housing, said protecting means including a portion having a predetermined thickness and a number of holes contained therein and which is situated adjacent to said first microphone means.

11. The telephone handset apparatus according to claim 10, wherein said predetermined thickness is less than approximately 0.030 of an inch.

12. The telephone handset apparatus according to claim 10, wherein said protecting means further includes a side portion and wherein said portion having said predetermined thickness is located below an upper portion of said side portion.

13. The telephone handset apparatus according to claim 12, wherein said protecting means is formed from a plastic-type material.

14. Apparatus for use with a telephone handset having a speaker portion and a receiver portion for reducing acoustical noise, said apparatus comprising:

a housing in the receiver portion having first microphone means for receiving a first acoustic sound composed of speech from an operator using said telephone handset and background noise in the vicinity of said speech and for converting said first acoustic sound to a first signal, and second microphone means arranged at a predetermined angle $\phi$ with respect to said first microphone means, and adjacent thereto, for receiving a second acoustic sound composed of substantially said background noise and for converting said second acoustic sound to a second signal; and means for subtracting said second signal from said first signal so as to obtain a signal representing substantially said speech.

15. The apparatus according to claim 14, wherein said predetermined angle $\phi$ lies within a range from approximately 30 degrees to approximately 60 degrees.

16. The apparatus according to claim 15, wherein said first microphone means is arranged in said housing such that an angle $\Theta$ formed between a plane passing through a portion of said first microphone means which receives said first acoustic sound and an input direction of said speech is less than approximately 35 degrees.

17. The apparatus according to claim 16, wherein said second microphone means is arranged in said housing such that an angle $\beta$ formed between an axis normal to the receiving portion of said second microphone means and said input direction of said speech is approximately equal to $[(90-\Theta)+\phi]$ degrees.

18. The apparatus according to claim 14, wherein at least one of said first and second microphone means includes a plurality of microphones.

19. The apparatus according to claim 14, further comprising amplifier means for selectively amplifying a signal received from another operator so as to produce an amplified signal therefrom.

20. The apparatus according to claim 19, wherein said first and second microphone means, said means for subtracting and said amplifier means are powered by standard power supplied to said telephone handset.

21. The apparatus according to claim 20, wherein said means for subtracting and said amplifier means are formed on a low-powered integrated circuit chip.

22. The apparatus according to claim 21, wherein said low-powered integrated circuit chip is a Complementary Metal Oxide Semi-conductor (CMOS) chip.

23. The apparatus according to claim 20, further comprising protecting means for protecting said housing, said protecting means including a portion having a predetermined thickness and a number of holes contained therein and which is situated adjacent to said first microphone means.

24. The apparatus according to claim 23, wherein said predetermined thickness is less than approximately 0.030 of an inch.

25. The apparatus according to claim 23, wherein said protecting means further includes a side portion and wherein said portion having said predetermined thickness is located below an upper portion of said side portion.

26. The apparatus according to claim 25, wherein said protecting means is formed from a plastic-type material.

27. The telephone handset apparatus according to claim 1, wherein said first and second microphones are matched to each other.

28. The apparatus according to claim 14, wherein said first and second microphone means are matched to each other.

* * * * *